(12) United States Patent
Hong et al.

(10) Patent No.: US 6,453,152 B1
(45) Date of Patent: Sep. 17, 2002

(54) METHOD AND APPARATUS FOR MEASURING A BASE STATION'S PERFORMANCE IN A MOBILE COMMUNICATION SYSTEM

(75) Inventors: Sung-tae Hong; Soo-yeul Oh, both of Sungnam (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/358,157

(22) Filed: Jul. 20, 1999

(30) Foreign Application Priority Data

Jul. 22, 1998 (KR) .............................. 98-29406

(51) Int. Cl.[7] .............................................. H04B 17/00
(52) U.S. Cl. ........................ 455/67.1; 455/561; 455/115
(58) Field of Search ................................ 455/423, 67.1, 455/561, 115, 424, 425, 67.4, 507, 517

(56) References Cited

U.S. PATENT DOCUMENTS

| | | | | |
|---|---|---|---|---|
| 5,568,135 A | * | 10/1996 | Shinozaki | 340/825.06 |
| 5,572,510 A | * | 11/1996 | Koivu | 370/13 |
| 5,694,451 A | * | 12/1997 | Arinell | 379/34 |
| 5,703,929 A | * | 12/1997 | Schillaci et al. | 379/21 |
| 5,706,333 A | * | 1/1998 | Grenning et al. | 455/423 |
| 5,719,563 A | * | 2/1998 | Thompson, Jr. | 340/870.02 |
| 5,764,726 A | * | 6/1998 | Selig et al. | 379/21 |
| 5,914,668 A | * | 6/1999 | Chavez, Jr. et al. | 340/7.39 |
| 6,094,577 A | * | 7/2000 | Han | 455/424 |
| 6,151,482 A | * | 11/2000 | Eriksson | 455/67.1 |
| 6,339,698 B1 | * | 1/2002 | Cullen | 455/67.1 |

* cited by examiner

Primary Examiner—Dwayne Bost
Assistant Examiner—Joy K. Contee
(74) Attorney, Agent, or Firm—Dilworth & Barrese, LLP

(57) ABSTRACT

A method for measuring a base station's performance in a mobile communication system. In the method a base station's performance is measured directly by a measurement apparatus without a base station controller. An apparatus for measuring a base station's performance is also provided, and has a measurement apparatus having a port for an exterior communication and a program for performing a measurement function, an interface module connected to said port and a base station's exterior communication port, for checking and controlling the status of a mobile communication base station via said measurement apparatus and an apparatus for transmitting an output signal of said base station to said measurement apparatus, preferably by wire.

4 Claims, 5 Drawing Sheets

METHOD AND APPARATUS FOR MEASURING A BASE STATION'S PERFORMANCE IN A MOBILE COMMUNICATION SYSTEM

BACKGROUND OF THE INVENTION

1. Field of the Invention

The present invention relates to an apparatus and method for measuring a base station's performance in a mobile communication system, and in particular, an apparatus capable of measuring performance, controlling the base station, improving performance measurement of the base station and automatically performing a plurality of measurements.

2. Description of the Related Art

As shown in FIG. 1, a conventional measurement method uses a base station control personal computer (PC) 105 with software. This PC communicates with a base station controller (BSC) generally located several kilometers away to direct a base station 101 to perform a measurement. For additional measurements, the steps of controlling and checking the base station would be executed again and again.

The conventional measurement method using a base station control personal computer 105 with software as stated above, will repeat the steps of controlling the base station whenever it takes a new measurement of the base station. It is a time-consuming process.

Furthermore, because a user executes all these processes, the time required to perform measurements and the results of measurement change according to the technique and expertise of the user.

SUMMARY OF THE INVENTION

It is an object of the present invention to provide an apparatus and method for measuring a base station's performance by using an apparatus to directly control the base station.

An apparatus for measuring a base station's performance in a mobile communication system comprises measurement apparatus having a port for exterior communication and a program for performing a measurement function, an interface module connected to both the port and a base station's exterior communication port, the interface module being used for checking and controlling the status of a mobile communication base station via the measurement apparatus and a means for transmitting an output signal of the base station to the measurement apparatus.

The interface module preferably comprises: a processor module for analyzing signals; a ROM module for operating said processor module; a base station interface module for communicating with a base station; a measurement apparatus interface module for communicating with a measurement apparatus; and a protocol conversion module for connecting said base station interface module and said measurement apparatus interface module and performing a protocol conversion.

A method for measuring a base station's performance in a mobile communication system using a measurement apparatus, comprises the steps of: selecting measurements to be made by said measurement apparatus in accordance with a request of a user; requesting and receiving from the user additional information necessary for taking said selected measurements; determining by said measurement apparatus whether the current status of said base station is suitable for performance measurement; ending said performance measurement if the current status of said base station is not suitable for performance measurement; saving the current status of said base station if the current status of said base station is suitable for performance measurement; selecting one of said measurements after said saving step and initializing said base station to enable the measurement apparatus to take the said selected measurement; confirming whether the initialization of said base station is successfully completed; returning to said initializing step, if the initialization of said base station is not successfully completed; initializing said measurement apparatus to take said selected measurement and then executing said measurement, once the initialization of said base station is successfully completed; reporting the results of said measurement and a reference for said selected measurement to the user and waiting for the user's instruction; re-controlling and re-measuring said base station, if the user requests a re-measurement because the original measurement is not correlated with the reference; and saving the results of measurement and ending said performance measurement when the user does not request a re-measurement because the original measurement is correlated with the reference.

In the preferred mode, before saving the results of measurement and ending performance measurement, the said method further comprises the steps of: reiterating said initializing and measuring steps, if another measurement has been requested by the user; and resetting the said base station to its original status, and ending the whole performance measurement, if no other measurements have been requested by the user.

In the preferred mode, communication between the base station and the measurement apparatus is made by the interface module described above.

DETAILED DESCRIPTION OF THE INVENTION

Figure 1:
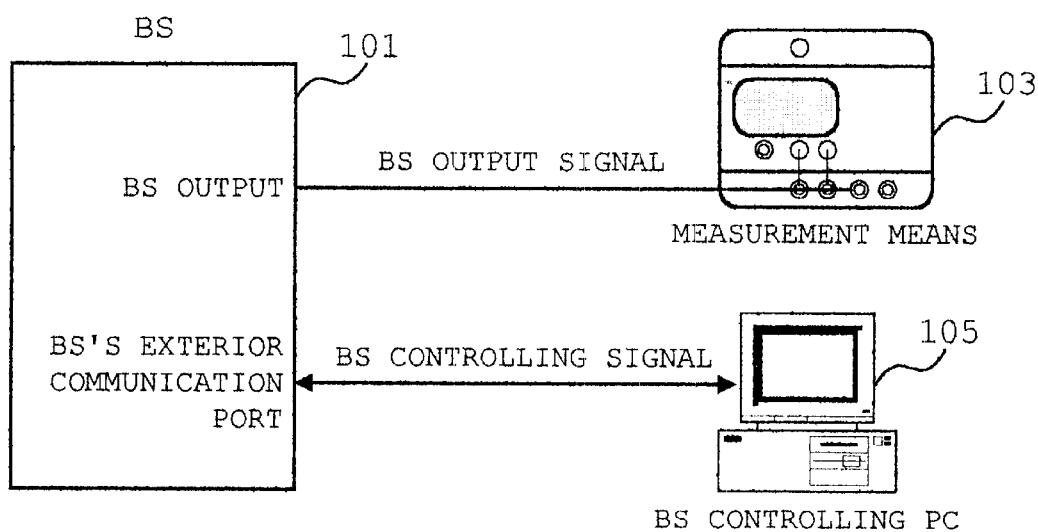
FIG. 1 illustrates a prior art apparatus for measuring a base station's performance.

In one embodiment of the present invention, an apparatus for measuring a base station's performance in a mobile communication system comprises measurement apparatus having a port for exterior communication and a program for performing a measurement function, an interface module connected to the port and a base station's exterior communication port, which said interface checks and controls the status of the base station via the measurement apparatus, and means for transmitting an output signal of the base station to the measurement apparatus. Preferably, the output signal is transmitted by wire.

Preferably, the interface module comprises a processor module for analyzing signals, a ROM module for preserving a operation program of the processor module, a base station interface module for communicating with a base station, a measurement apparatus interface module for communicating with a measurement apparatus and a protocol conversion module for connecting the base station interface module and the measurement apparatus interface module and performing a protocol conversion.

In an embodiment of the present invention, the performance measurement method comprises the steps of: selecting items to be measured by said measurement apparatus in accordance with a request of a user; requesting the user to input additional information necessary for performing said selected measurements; determining by said measurement apparatus whether the current status of a base station is suitable for performance measurement; ending said performance measurement if the current status of said base station is not suitable for performance measurement; saving the current status of said base station if the current status of said base station is suitable for performance measurement; selecting one of said measurements after said saving step and initializing said base station to enable the selected measurement to be performed by said measurement apparatus; confirming whether the initialization of said base station is successfully completed; returning to said initializing step, if the initialization of said base station is not successfully completed; initializing said measurement apparatus to take the selected measurement and then executing said measurement, once the initialization of the base station is successfully completed; reporting the results of the measurement and a reference value for said selected measurement to the user and waiting for the user's instruction; re-controlling and re-measuring said base station, if the user requests a re-measurement because the measurement is not correlated with the reference; and saving the results of measurement and ending said performance measurement if the user does not request a re-measurement because the results of measurement correlate with the reference.

The preferred mode of the method is that before saving the results of measurement and ending said performance measurement, said method further comprises the steps of: reiterating said initializing and measuring steps, if another measurement has been requested by the user; and resetting the base station to its original status, and ending the whole performance measurement, if no other measurements have been requested by the user.

In the preferred mode of the method, the communication between the base station and the measurement apparatus is made by an interface module, preferably as described above.

Figure 2:
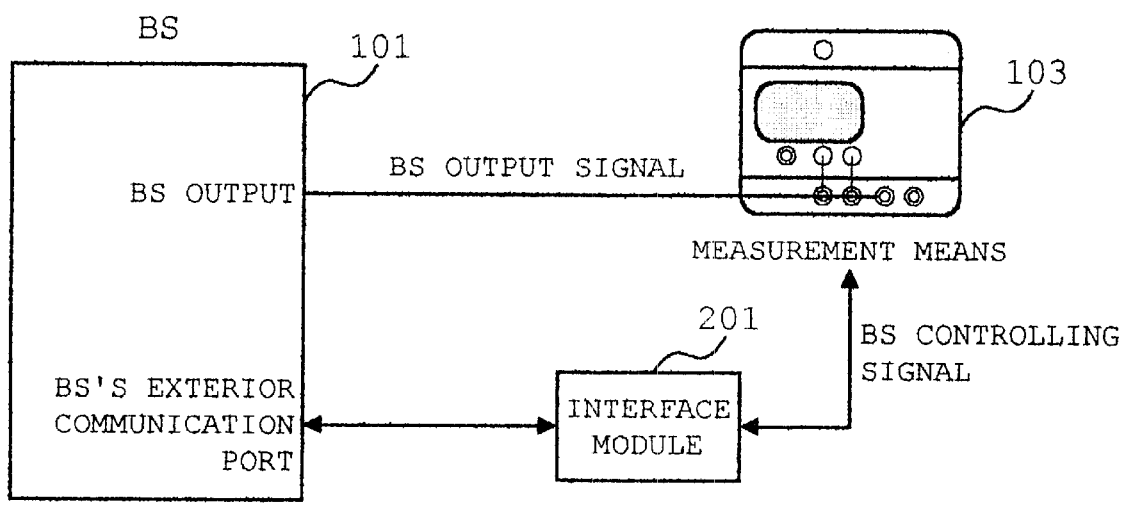
FIG. 2 illustrates an apparatus for measuring a base station's performance in accordance with the present invention.

FIG. 2 illustrates an apparatus for measuring a base station's performance in accordance with the present invention. In order to measure a base station's performance, a signal of the base station is transmitted to a measurement apparatus 103, preferably by wire or other suitable means, and the measurement apparatus 103, communicates with the base station via an interface module 201, which controls the base station and checks the status of the base station.

In one embodiment of the present invention, the measurement apparatus 103 can be the Code Domain Analyzer (model:HP8921A, HP*8935) of the HP company, or any suitable apparatus which is capable of controlling a measurement apparatus in accordance with a program via an internal processor and has a port for exterior communication.

As shown in FIG. 2, The interface module 201 connects the base station 101 and the measurement apparatus 103.

Figure 3:
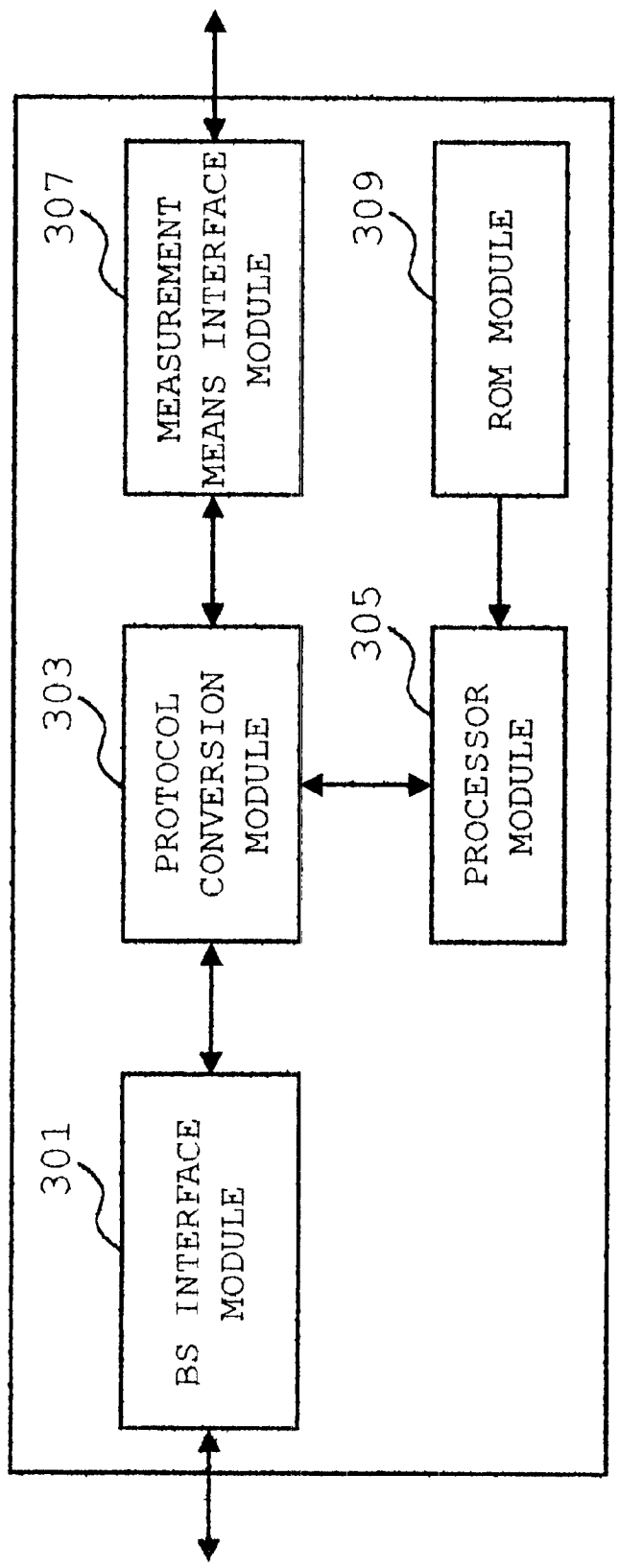
FIG. 3 is a block diagram of an interface module in accordance with the present invention.

FIG. 3 is a drawing illustrating the internal architecture of the interface module 201, which interfaces between a base station 101 and a measurement apparatus 103. The interface module 201 comprises a processor module 305 for analyzing signals; a ROM 309 for preserving a operation program of the processor module; a base station interface module 301 for connecting a base 101; a measurement apparatus interface module 307 for connecting the measurement apparatus 103; and a protocol conversion module 303 for converting communication protocols of the base station interface module 301 and a measurement apparatus interface module 307.

Figure 4:
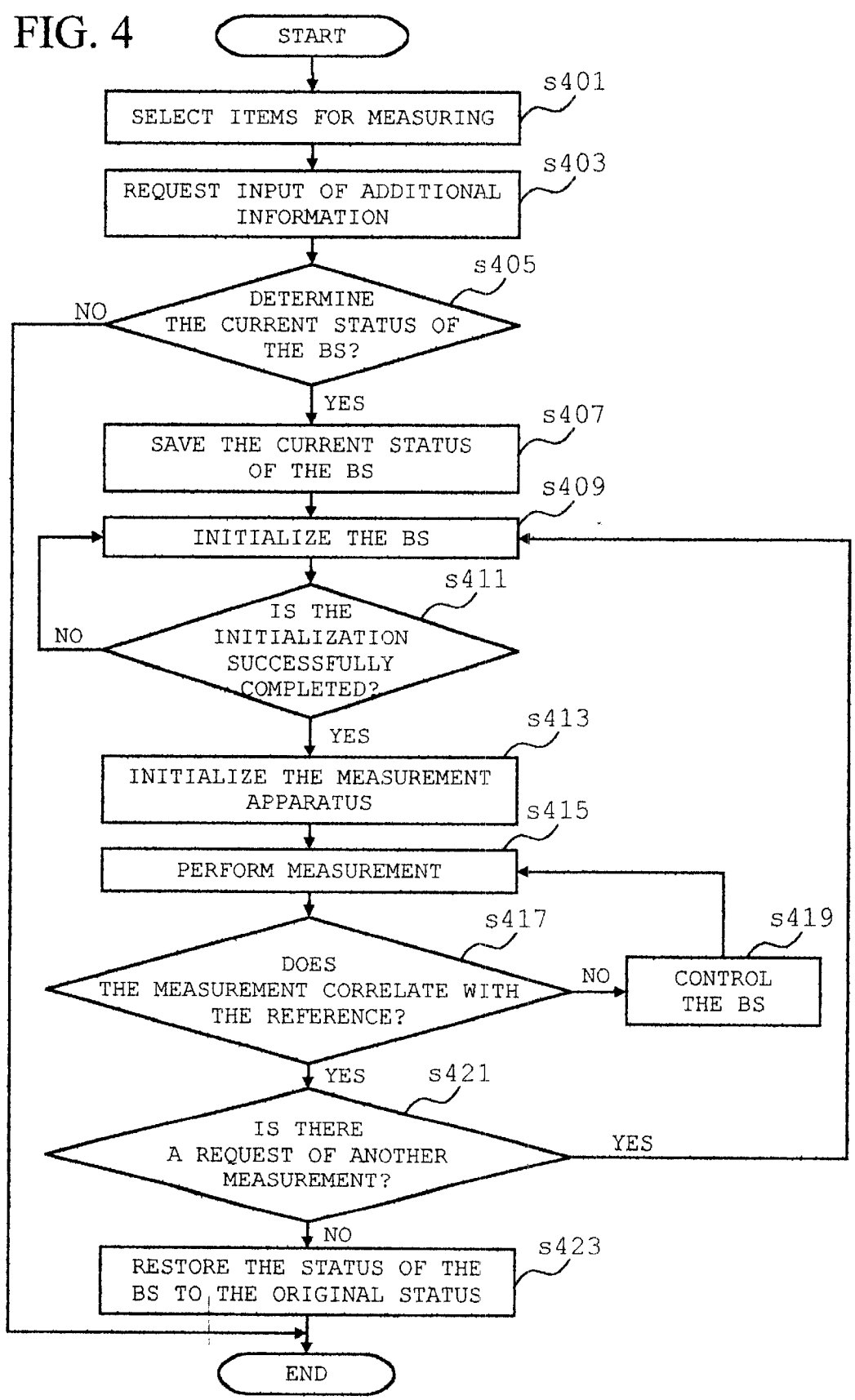
FIG. 4 is a flow chart showing an embodiment of measuring a base station's performance in accordance with the present invention.

FIG. 4 is a flow chart of an embodiment of the process of measuring a base station's performance in accordance with the present invention. The user selects items for measuring (step 401) and the measurement apparatus 103 requests the user to input additional information necessary for the corresponding measurement according to the predetermined internal program (step 403). The measurement apparatus 103 finds out whether the current status of the base station is suitable for the performance measurement (step 405) If it is, the current status of the base station is saved (step 407). If not, the process ends.

The measurement apparatus 103 transmits a controlling command to the base station, and initializes the base station to make the selected measurement of the base station (step 409) and confirms the status of the initialization of the base station (step 411). If the initialization of the base station is successfully completed, the measurement apparatus is initialized (step 413) and the selected measurement is taken (step 415). If the initialization is not successful, the process returns to the initialization step 409 to attempt to initialize again.

The results of the measurement together with a reference for the corresponding measurement are correlated (step 417). If the correlation is outside acceptable bounds, the base station is re-controlled (step 419) and re-measured (step 415) according to the user's instruction. If they are properly correlated and there are no additional measurement requests from the user (step s421), the results of the measurement are saved and the measuring of the corresponding item is closed. If there is a request for another measurement (step s421), the base station should return to the initialization step (s409) and repeat steps s409 through s421. If there is no request, the base station is restored to its original status (step s423) and the measurement ends.

If the user initially selects measurements and enters all the information that might be necessary in step s403 to make those measurements, all measurements can be automatically executed by the measurement apparatus. When controlling of the base station is requested in accordance with the results of measurements, the user can control the status of the base station referring to the results of the corresponding measurement. But when checking is requested, the user can check the results of performance measurements after execution of all measurements.

Figure 5:
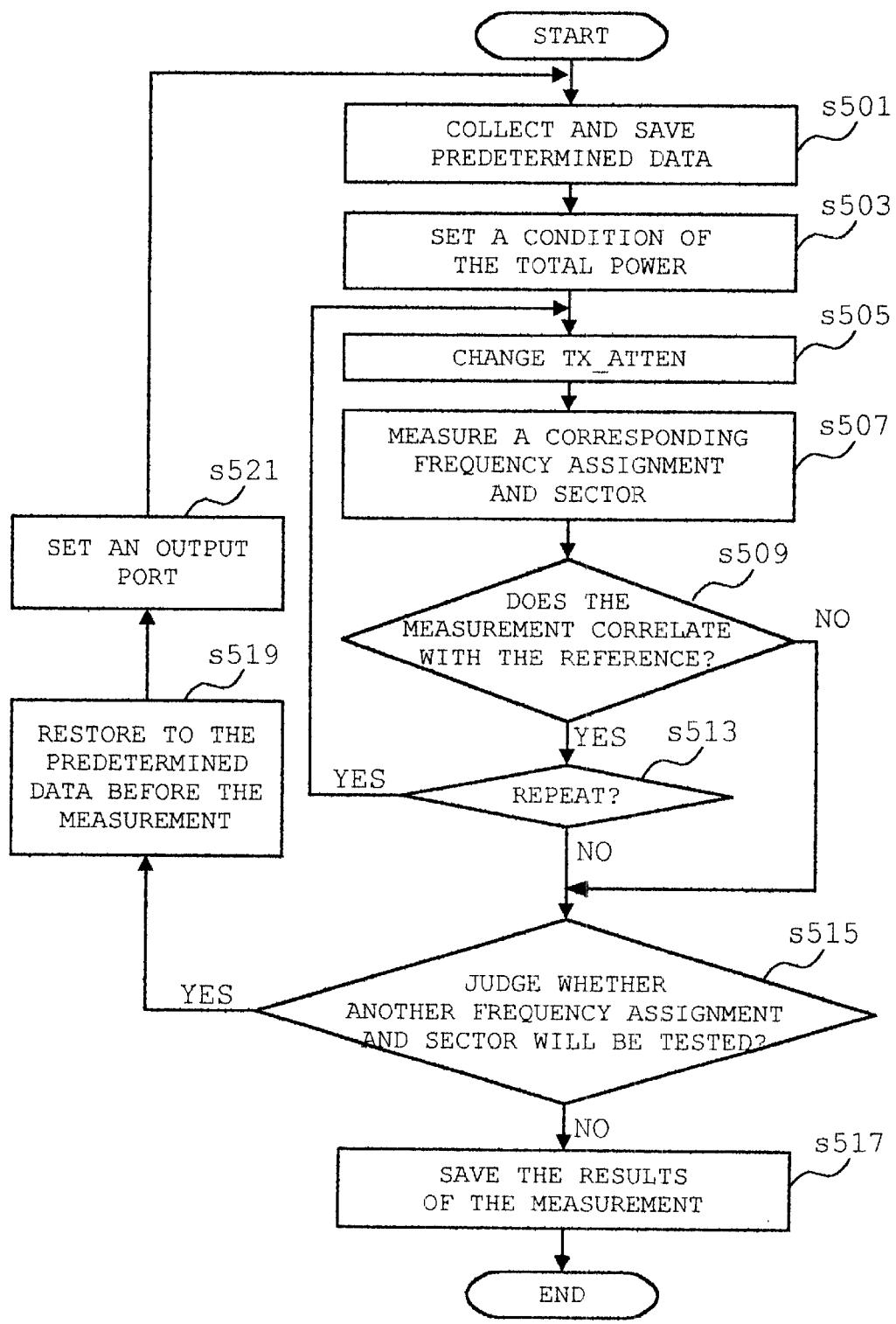
FIG. 5 is a flow chart showing an exemplary method of testing and controlling transmission power (Tx_power) in accordance with the present invention.

FIG. 5 is an example of testing and controlling transmission power (Tx_power) in accordance with the present invention. The measurement apparatus collects and saves predetermined data in a base station before testing according to a measuring command from the user (step s501) and sets a condition of the total power of the base station required for the testing (step s503). For example, the measurement apparatus can set a pilot channel, a paging channel, a synchronizing channel and a traffic channel to 108, 105, 52 and 74, respectively as the condition of the total power.

The measurement apparatus changes the digital gain of an overhead channel of the base station, establishes 6 orthogonal channel noise simulators (OCNS) corresponding to a test call, and changes the base station's transmission attenuation (Tx_Atten) (step 505). For example, when 0≦Tx.Atten≦600, Tx_Atten/10 dB is reduced and when 900≦Tx.Atten≦950, (Tx_Atten−900)/10 dB is increased.

A measurement of a corresponding frequency assignment and sector is made (step s507) and a verifying process of the change of the base station's output power is automatically performed. The result of the measurement is compared with a predetermined reference and it is determined whether the result correlates with the predetermined reference or not (step s509). When it is determined that the result does not correlate with the predetermined reference, the measurement apparatus determines whether another frequency assignment and sector will be tested (step s515). On the other hand, when the result correlates with the predetermined reference, the measurement apparatus returns to step s505 and repeats the following steps.

In a case where there is another frequency assignment and sector, the measurement apparatus restores to the predetermined data prior to measurement (step 519) and sets an output port (Step 521).

Finally, the measurement apparatus stores the results of the measurement of the frequency assignment and sector (step 517), restores the base station to the original status and terminates the measurement.

Once a user performs basic conditions required for executing measurement as stated above, controlling of all base stations and repeated measuring are automatically executed by a measurement apparatus.

The present invention can save measuring time and obtain reliability with the results of measurement. Also, the present invention is capable of executing consecutive automatic tests.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for measuring a base station's performance in a mobile communication system using a measurement apparatus, comprising the steps of:

selecting measurements to be taken by said measurement apparatus in accordance with a request of a user;

requesting the user to input additional information necessary for performing a selected measurement;

determining whether the current status of said base station is suitable for performance measurement using said measurement apparatus;

ending said performance measurement if the current status of said base station is not suitable for performance measurement;

saving the current status of said base station if the current status of said base station is suitable for performance measurement;

selecting one of said measurements after said saving step and initializing said base station to enable the selected measurement to be performed by said measurement apparatus;

confirming whether the initialization of said base station is successfully completed;

returning to said initializing step, if the initialization of said base station is not successfully completed;

initializing said measurement apparatus to take the selected measurement and then executing said measurement, once the initialization of said base station is successfully completed;

reporting the results of said measurement and reference on said selected measurement to the user and waiting for the user's instruction;

re-controlling and re-measuring said base station, if the user requests a re-measurement because the results of measurement do not correlate with the reference; and saving the results of measurement and ending said performance measurement, if the user does not request a re-measurement because the results of measurement correlate with the reference.

2. The method as set forth in claim 1, before saving the results of measurement and ending said performance measurement, said method further comprising the steps of:

reiterating said subsequent steps from said initializing step, if another performance measurement has been requested by the user; and setting the status of said base station to the original status, and ending the performance measurement, if no more performance measurements have been requested by the user.

3. The method as set forth in claim 1, wherein communication between said base station and said measurement apparatus is made by an interface module.

4. The method as set forth in claim 3, wherein said interface module includes processor module for analyzing signals;

ROM module for preserving a operation program for said processor module;

base station interface module for communicating with a base station;

measurement apparatus interface module for communicating with a measurement apparatus; and protocol conversion module for connecting said base station interface module and said measuring interface module and performing a protocol conversion.

* * * * *